United States Patent [19]

Murai

[11] Patent Number: 5,920,823
[45] Date of Patent: Jul. 6, 1999

[54] SYSTEM FOR CONTROLLING ELECTRIC POWER TRANSMITTED IN REVERSE CHANNEL

[75] Inventor: Kiyokazu Murai, Tokyo, Japan

[73] Assignee: NEC Corporation, Tokyo, Japan

[21] Appl. No.: 08/877,839

[22] Filed: Jun. 16, 1997

[30] Foreign Application Priority Data

Jun. 21, 1996 [JP] Japan .................................... 8-161741

[51] Int. Cl.$^6$ .................................................. H04B 7/00
[52] U.S. Cl. .......................... 455/522; 455/524; 455/442; 455/67.1
[58] Field of Search .............................. 455/522, 69, 442, 455/67.1, 67.3, 95, 524, 525, 561; 370/318, 333, 335, 342; 375/200

[56] References Cited

U.S. PATENT DOCUMENTS 5,241,690  8/1993  Larsson et al. .......................... 455/522
5,771,451  6/1998  Takai et al. .............................. 455/442

OTHER PUBLICATIONS

"An Overview of the Application of Code Division Multiple Access (CDMA) to Digital Cellular Systems and Personal Cellular Networks", May (1992), pp. 1–58.

Primary Examiner—Reinhard J. Eisenzopf
Assistant Examiner—Lester G. Kincaid
Attorney, Agent, or Firm—Foley & Lardner

[57] ABSTRACT

The object of the present invention is to minimize the value of transmitted electric power in the reverse channel of a mobile radio station when a plurality of radio communication lines are connected for a relatively long period of time as upon no-break soft hand-over. The system for controlling the electric power transmitted in a reverse channel of the present invention is a mobile communication system for reducing the value of transmitted electric power of a mobile radio station being connected when communication quality of a signal received from the mobile radio station exceeds a range of permitted values. The system includes a base station control station which controls base radio stations. The base station control station has an error rate measuring circuit for selectively combined signals in reverse channels transmitted from the mobile radio station through all the connected communication lines and a reverse channel transmitted electric power correction control circuit. Each of the base radio stations has a reverse channel transmitted electric power control circuit.

5 Claims, 2 Drawing Sheets

5,920,823

SYSTEM FOR CONTROLLING ELECTRIC POWER TRANSMITTED IN REVERSE CHANNEL

BACKGROUND OF THE INVENTION

1. Field of the Invention

The present invention relates to a system for controlling the electric power transmitted in a reverse channel in a mobile communication system, and more particularly to a system for controlling the electric power transmitted in a reverse channel when a plurality of radio communication lines are simultaneously connected to a single mobile radio station for a relatively long period of time on a network as upon soft hand-over in a CDMA (Code Division Multiple Access) method.

2. Description of the Related Art

As one conventional system for controlling the electric power transmitted in a reverse channel, there is an invention "Transmitted Electric Power Controlling System" disclosed in Japanese Patent Laid-open publication No. 16149/89. The disclosed system serves to judge accurately the value of transmitted electric power to be controlled in view of the quality of communication lines. The system measures the communication qualities including a reception level, bit error rate, and so forth of individual reverse channels in use with reception level judging circuits, bit error rate judging circuits, and so forth installed in respective base radio stations, and minimizes the value of transmitted electric power of mobile radio stations in use with a transmitted electric power control signal generating circuit or the like for each of the respective communication lines to be controlled individually such that the communication qualities will not drop below range of permitted values.

FIG. 1 of the accompanying drawings shows in block form a circuit arrangement applied to the conventional system for controlling the electric power transmitted in a reverse channel, showing the objects as disclosed in the above publication applied to a mobile communication system.

In FIG. 1, a communication line which transmits from a mobile radio station 11 to a base radio station 21 is referred to as a reverse channel. A signal in the reverse channel is transmitted from a transmitter 12 of the mobile radio station 11 through a transmitting/receiving antenna 14 of the mobile radio station 11 and a transmitting/receiving antenna 22 of the base radio station 21 to a receiver 23 of the base radio station 21, which relays a demodulated signal to an upper-layer station.

The receiver 23 of the base radio station 21 corresponds to a receiver group 1 shown in FIG. 1 of the above publication. The base radio station 21 has a radio communication quality measuring circuit 24 which corresponds to a measuring unit of reception level judging circuit 2 and a measuring unit of bit error rate judging circuit 3 which are shown in FIG. 1 of the above publication. The radio communication quality measuring circuit 24 measures radio communication qualities including the reception level, bit error rate, and so forth of a signal received by the receiver 23 of the base radio station 21. The base radio station 21 also has a reverse channel transmitted electric power control circuit 25 which corresponds to a circuit that is a combination of a judging unit of the reception level judging circuit 2, a judging unit of the bit error rate judging circuit 3, and a transmitted electric power control signal generating circuit 4 which are shown in FIG. 1 of the above publication. The reverse channel transmitted electric power control circuit 25 checks the radio communication qualities measured by the radio communication quality measuring circuit 24 against a permitted range of preset values to judge whether there is still a margin by which the value of transmitted electric power of the mobile radio station 11 can further be reduced. If there is such a margin, then the reverse channel transmitted electric power control circuit 25 sends a command signal through a transmitter 26 and the transmitting/receiving antenna 22 to the mobile radio station 11 to instruct the mobile radio station 11 to reduce the value of reverse channel transmitted electric power thereof. The transmitter 26 corresponds to a transmitter 5 shown in FIG. 1 of the above publication.

The mobile radio station 11 has a transmitted electric power control circuit 13. When the transmitted electric power control circuit 13 receives a command signal to reduce the reverse channel transmitted electric power transmitted from the reverse channel transmitted electric power control circuit 25 through the transmitting/receiving antenna 14 and a receiver 15, the transmitted electric power control circuit 13 reduces the value of transmitted electric power of the transmitter 12.

One problem of the conventional system shown in FIG. 1 of the accompanying drawings is that when a plurality of radio channels are connected for a relatively long period of time and signals of all reverse channels are selectively combined and relayed to a upper-layer station as upon no-break soft hand-over, it is not possible to achieve a maximum effect for reducing the value of electric power transmitted in reverse channels of the mobile radio stations with only the conventional reverse channel transmitted electric power control process.

The reasons for the above drawbacks are as follows: In a base station control station which connects a plurality of radio communication lines, the communication qualities of reverse channels which have been selectively combined are higher than the communication qualities of individual communication lines. However, according to the conventional reverse channel transmitted electric power control process, the base station control station, which connects a selectively combined plurality of radio communication lines, has no communication quality measuring functions to measure the communication qualities of reverse channels which have been selectively combined and also no abilities to reflect those communication qualities in the control of the value of transmitted electric power in the reverse channels of the respective base radio stations. Here, selectively combined connecting means bringing together into one channel those communication lines which have been connected to one mobile radio station through a plurality of mobile base stations by base station control station.

SUMMARY OF THE INVENTION

In view of the problem of the prior art, the object of the present invention is to minimize the value of transmitted electric power in the reverse channel of a mobile radio station when a plurality of radio communication lines are connected for a relatively long period of time as upon no-break soft hand-over.

To achieve the above object, the system for controlling the electric power transmitted in a reverse channel of the present invention is a mobile communication system controlling to reduce a value of transmitted electric power of a mobile radio station being connected when the communication quality of a signal received from the mobile radio station exceeds a range of permitted values, comprising a plurality of base radio stations and a base station control station having the base radio stations as subordinates, the base station control station comprising an error rate measuring circuit for, while the base station control station is simultaneously connecting communication lines of the base radio stations to the mobile radio station, measuring at set periodic intervals error rate of selectively combined signals in reverse channels transmitted from the mobile radio station through all the connected communication lines to the base radio stations, and transmitting the measured error rate, and a reverse channel transmitted electric power correction control circuit for receiving the measured error rate transmitted from the error rate measuring circuit, and, if the measured error rate exceeds the upper or lower limit of a permitted range of preset minimum values, transmitting a corrective value for the value of transmitted electric power of the mobile radio station being connected to the base radio stations to which the communication lines are connected, each of the base radio stations comprising a reverse channel transmitted electric power control circuit responsive to the transmitted corrective value for the value of transmitted electric power from the reverse channel transmitted electric power correction control circuit, for instructing the mobile radio station to correct the value of reverse channel transmitted electric power from the mobile radio station according to the transmitted corrective value in preference to a corrective value measured and calculated for the value of transmitted electric power by the base radio station.

While the base station control station is simultaneously connecting communication lines of the base radio stations to the mobile radio station, the error rate measuring circuit measures at set periodic intervals error rate per bit or per frame of selectively combined signals in reverse channels transmitted from the mobile radio station through all the communication lines to the base radio stations, and transmits the measured error rate to the reverse channel transmitted electric power correction control circuit. If the measured error rate exceeds the upper or lower limit of the permitted range of the preset minimum values, the reverse channel transmitted electric power correction control circuit transmits the corrective step value for the value of transmitted electric power of the mobile radio station being connected to the base radio stations to which the communication lines are connected, for thereby step down or step up the value of transmitted electric power from the present level. The reverse channel transmitted electric power control circuit measures and calculates at set periodic intervals the reception level of a signal received in reverse channels and error rate, and if the measured and calculated value exceeds the upper or lower limit of a permitted range of preset minimum values, the reverse channel transmitted electric power control circuit instructs the mobile radio station to step down or step up the value of transmitted electric power in the reverse channels from the present level. When the reverse channel transmitted electric power control circuit receives the correction signal from the reverse channel transmitted electric power correction control circuit, the reverse channel transmitted electric power control circuit instructs the mobile radio station to correct the value of transmitted electric power in the reverse channels in preference to the corrective value measured and calculated.

In the system for controlling the electric power transmitted in a reverse channel of the present invention described above, the reverse channel transmitted electric power control circuit transmits a present setting value of transmitted electric power in the reverse channels at set periodic intervals, or at a level changing occasion, to the reverse channel transmitted electric power correction control circuit, and the reverse channel transmitted electric power correction control circuit receiving the present setting value of transmitted electric power in the reverse channels, corrects the present setting value of transmitted electric power in the reverse channels using the transmitted corrective value for the value of transmitted electric power in the reverse channels instructed to the mobile radio station, and transmitting the corrected setting value of transmitted electric power in the reverse channels to the each of base radio stations.

In the system for controlling the electric power transmitted in a reverse channel of the present invention described above, when the base station control station starts simultaneously connecting communication lines of the base radio stations to the mobile radio station, the reverse channel transmitted electric power correction control circuit transmits a reverse channel transmitted electric power correction start signal to the base radio station, and, when the base station control station ends, simultaneously connecting communication lines of the base radio stations to the mobile radio station, transmitting a reverse channel transmitted electric power correction end signal to the base radio station. After the reverse channel transmitted electric power correction start signal is received and until the reverse channel transmitted electric power correction end signal is received, the reverse channel transmitted electric power control circuit controls the value of transmitted electric power of the mobile radio station using the corrective value of the value of transmitted electric power in the reverse channels instructed from the base station control station in preference to the corrective value measured and calculated for the value of transmitted electric power in the reverse channels by the base radio station.

In the system for controlling the electric power transmitted in a reverse channel of the present invention described above, the error rate measuring circuit measures at the set periodic intervals the error rate and a signal power to noise power ratio of selectively combined signals in transmitted reverse channels of all the connecting communication lines, and transmits the measured error rate and the measured signal power to noise power ratio to the reverse channel transmitted electric power correction control circuit, and if the measured error rate and the measured signal power to noise power ratio exceed the upper or lower limits of the permitted range of preset minimum values, the reverse channel transmitted electric power correction control circuit judges whether the value of transmitted electric power is to be corrected or not and calculates the corrective value for the value of transmitted electric power, and, if the value of transmitted electric power is to be corrected, the reverse channel transmitted electric power correction control circuit transmits the corrective value for the value of transmitted electric power in the reverse channels of the mobile radio station being connected, to the base radio stations to which the communication lines are connected.

In the system for controlling the electric power transmitted in a reverse channel of the present invention described above, when the base station control station starts simultaneously connecting communication lines of the base radio stations to the mobile radio station, the reverse channel transmitted electric power correction control circuit transmits the measured error rate or a measured signal power to noise power ratio from the error rate measuring circuit to the base radio stations to which the communication lines are connected, and the reverse channel transmitted electric power control circuit calculates the corrective value for the value of transmitted electric power of the mobile radio station being connected, based on the measured error rate or the measured signal power to noise power ratio received, and instructs the mobile radio station to correct the value of transmitted electric power.

With the above arrangement, while a plurality of radio communication lines are being connected for a relatively long period of time as upon no-break soft hand-over, the value of transmitted electric power of the mobile radio station can be reduced to a maximum value unlike the conventional system. As a result, interferences between adjacent channels are avoided, and radio frequencies can be reused with increased efficiency.

The reasons for the above advantages are given below. With the conventional system for controlling the value of transmitted electric power in reverse channels, while a plurality of radio communication lines are being connected for a relatively long period of time as upon no-break soft hand-over, the communication qualities of reverse channels selectively combined by the base station control station are higher than the communication qualities of individual channels. However, since the reverse channels are selectively combined individually for the respective communication lines by the respective base radio stations, the value of transmitted electric power in the reverse channels cannot be reduced to a maximum value.

According to the present invention, however, the base station control station which connects the radio communication lines of the mobile communication system measures the communication qualities of reverse channels which have been selectively combined upon a soft hand-over connection, and corrects the value of transmitted electric power in the reverse channels in each of the base radio station. Consequently, it is possible to reduce the value of transmitted electric power of the mobile radio station to a maximum value unlike the conventional system.

The above and other objects, features, and advantages of the present invention will become apparent from the following description with references to the accompanying drawings which illustrate an example of the present invention.

DETAILED DESCRIPTION OF THE PREFERRED EMBODIMENT

Construction

Figure 2:
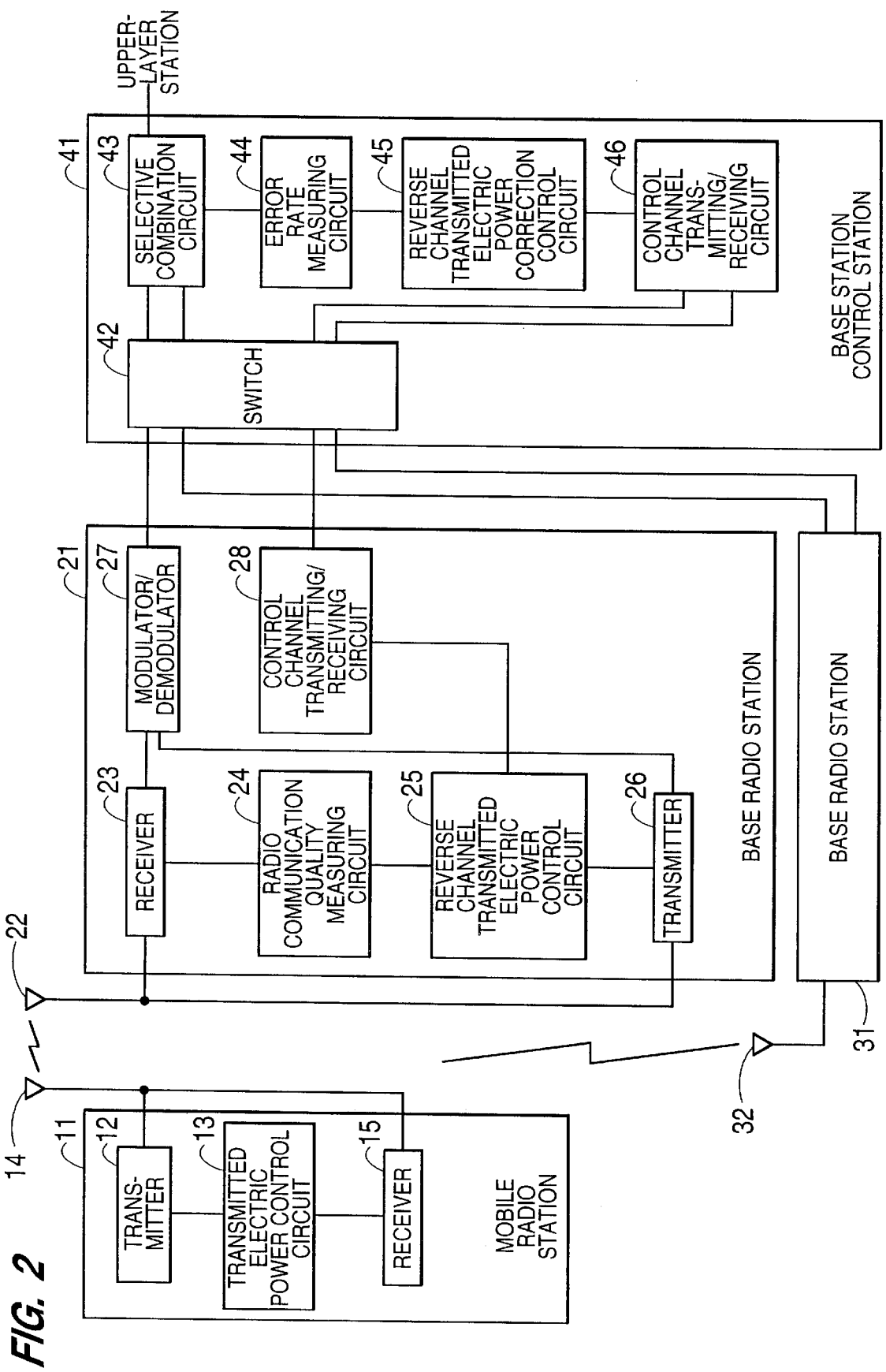
FIG. 2 is a block diagram of a circuit arrangement applied to a system for controlling the electric power transmitted in a reverse channel according to the present invention.

FIG. 2 shows in block form a circuit arrangement applied to a system for controlling the electric power transmitted in a reverse channel according to the present invention. As shown in FIG. 2, the system is incorporated in a mobile communication system which basically comprises a mobile radio station 11, base radio stations 21, 31, and a base station control station 41.

As the constituents of the present invention, the mobile radio station 11 comprises a transmitter 12, a transmitted electric power control circuit 13, a transmitting/receiving antenna 14, and a receiver 15. The base radio station 21 comprises a transmitting/receiving antenna 22, a receiver 23, a radio communication quality measuring circuit 24, a reverse channel transmitted electric power control circuit 25, a transmitter 26, a modulator/demodulator 27, and a control channel transmitting/receiving circuit 28. The base radio station 31 comprises a transmitting/receiving antenna 32 and other objects (not shown) which are identical with the base radio station 21. Those non-illustrated other objects identical to the circuits 23~28 will be referred to as corresponding terms with reference numerals 33~38. The base station control station 41 which has the base radio stations 21, 31 as subordinates comprises a switch 42, a selective combination circuit 43, an error rate measuring circuit 44, a reverse channel transmitted electric power correction control circuit 45, and a control channel transmitting/receiving circuit 46.

Figure 1:
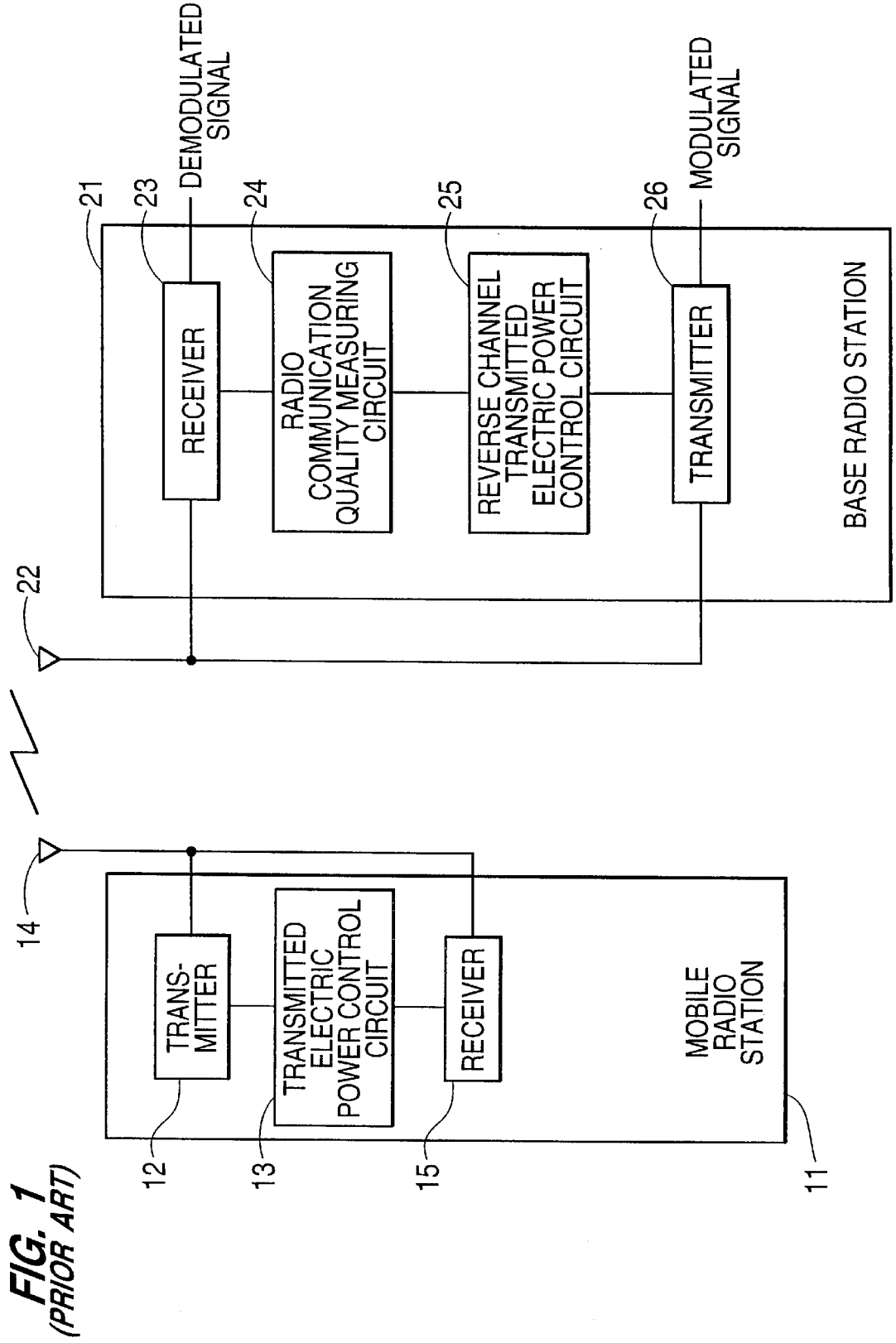
FIG. 1 is a block diagram of a circuit arrangement applied to a conventional system for controlling the electric power transmitted in a reverse channel.

The mobile radio station 11 has the same structural arrangement as the mobile radio station 11 of the prior art described above with reference to FIG. 1, and will not be described in detail below. The radio communication quality measuring circuits 24, 34 in the base radio stations 21, 31 are equivalent to the radio communication quality measuring circuit 24 in the base radio station 21 of the prior art described above with reference to FIG. 1. The radio communication quality measuring circuits 24, 34 measure not only a reception level and error rate per bit (herein below referred to as "bit error rate"), but also communication qualities including a signal power to noise power ratio, error rate per frame (herein below referred to as "frame error rate"), and so forth.

Operation

The system for controlling the electric power transmitted in a reverse channel according to the present invention is operable selectively according to first through fifth reverse channel transmitted electric power correction control processes.

The first reverse channel transmitted electric power correction instruction process will be described below. When a radio communication line is established between the mobile radio station 11 and the mobile radio station 21, the transmitted electric power control circuit 13 sets the value of electric power transmitted in a reverse channel of the transmitter 12 to a maximum value. The radio communication line is connected from the transmitter 12 and the receiver 15 through the transmitting/receiving antenna 14, the transmitting/receiving antenna 22, the receiver 23, the modulator/demodulator 27, the switch 42, and the selective combination circuit 43 to an upper-layer station.

When a communication begins, the radio communication quality measuring circuit 24 measures at set periodic intervals the reception level of a received signal of the reverse channel and communication quality such as bit error rate or frame error rate of the received signal, and transmits the measured results to the reverse channel transmitted electric power control circuit 25.

When the value of electric power transmitted in the reverse channel of the transmitter 12 is at a maximum value, since the measured reception level exceeds the upper limit of a permitted range of minimum values, the reverse channel transmitted electric power control circuit 25 transmits a transmitted electric power reduction step value through the transmitter 26 and the transmitting/receiving antenna 22 to the mobile radio station 11. When the transmitted electric power control circuit 13 receives the transmitted electric power reduction step value through the transmitting/receiving antenna 14 and the receiver 15, the transmitted electric power control circuit 13 reduces the value of electric power transmitted in the reverse channel of the transmitter 12 by the indicated steps. At this time, the error rate measuring circuit 44 in the base station control station 41 is not yet in operation.

For effecting no-break soft hand-over communications between the base radio station 21 and the base radio station 31 while the mobile radio station 11 is moving from the service area of the base radio station 21 into the service area of the base radio station 31, the base station control station 41 simultaneously connects a communication line through the base radio station 31 and a communication line through the base radio station 21 to the mobile radio station 11. The modulator/demodulator 37 in the base radio station 31 is connected through the switch 42 to the selective combination circuit 43, which connects the communication line to the base radio station 21 and the communication line to the base radio station 31 in a multiple connection mode, whereupon the selective combination circuit 43 is connected through a single line to the upper-layer station.

The selective combination circuit 43 selectively combines signals in reverse channels. Since the selective combination circuit 43 selects communication lines whose signals are free of bit or frame errors and combines them in a time series fashion, the error rate of the signals which have been selectively combined is higher than the error rates of the signals in the individual communication lines. When the selectively combined connection begins, the error rate measuring circuit 44 measures at set periodic intervals the bit or frame error rate of selectively combined signals in the reverse channels of all the communication lines which are being connected, and sends the measure result to the reverse channel transmitted electric power correction control circuit 45.

Unless the measured result from the error rate measuring circuit 44 exceeds the lower limit of a permitted range of preset minimum values, the reverse channel transmitted electric power correction control circuit 45 transmits a transmitted electric power reduction step value through the control channel transmitting/receiving circuit 46 and the switch 42 to the base radio stations 21, 31 being connected to the communication line to step down the value of transmitted electric power of the mobile radio station 11 being connected from the present level.

When the reverse channel transmitted electric power control circuits 25, 35 in the base radio stations 21, 31 receive the transmitted power reduction step value through the respective control channel transmitting/receiving circuits 28, 38, the reverse channel transmitted electric power control circuits 25, 35 correct the value of transmitted electric power of the mobile radio station 11 according to the received power reduction step value in preference to power reduction step values which are individually measured and calculated by the base radio stations 21, 31. To correct the value of transmitted electric power of the mobile radio station 11, the reverse channel transmitted electric power control circuits 25, 35 transmit the power reduction step value through the respective transmitters 26, 36 and the respective transmitting/receiving antennas 22, 32 to the mobile radio station 11. In response to the transmitted power reduction step value received through the transmitting/receiving antenna 14 and the receiver 15, the transmitted electric power control circuit 13 reduces further the velue of transmitted electric power of the transmitter 12 by the indicated steps according to the power reduction step value which is sent from either one of the-base radio stations 21, 31. Since the same power reduction step value is normally sent from the base radio stations 21, 31, the transmitted electric power control circuit 13 may reduce the value of transmitted electric power according to the power reduction step value from the base radio station 21 or the power reduction step value from the base radio station 31.

If the measured result from the error rate measuring circuit 44 is lower than the lower limit of the permitted range of the preset minimum values, then the reverse channel transmitted electric power correction control circuit 45 transmits a power increase step value through the control channel transmitting/receiving circuit 46 and the switch 42 to the base radio stations 21, 31 being connected to the communication line to step up the value of transmitted electric power of the mobile radio station 11 being connected from the present level.

When the reverse channel transmitted electric power control circuits 25, 35 in the base radio stations 21, 31 receive the transmitted power increase step value through the respective control channel transmitting/receiving circuits 28, 38, the reverse channel transmitted electric power control circuits 25, 35 transmit the power increase step value through the respective transmitters 26, 36 and the respective transmitting/receiving antennas 22, 32 to the mobile radio station 11 in order to correct the value of transmitted electric power of the mobile radio station 11. In response to the transmitted power increase step value received through the transmitting/receiving antenna 14 and the receiver 15, the transmitted electric power control circuit 13 increases the value of transmitted electric power of the transmitter 12 by the indicated steps according to the power increase step value which is sent from either one of the base radio stations 21, 31. Since the same power increase step value is normally sent from the base radio stations 21, 31, the transmitted electric power control circuit 13 may increase the value of transmitted electric power according to the power increase step value from the base radio station 21 or the power increase step value from the base radio station 31.

The second reverse channel transmitted electric power correction instruction process will be described below. The reverse channel transmitted electric power control circuits 25, 35 in the base radio stations 21, 31 transmit at set periodic intervals or at a level changing occasion the present setting values of transmitted electric power in the reverse channels in use through the control channel transmitting/receiving circuits 28, 38, the switch 42, and the control channel transmitting/receiving circuit 46 to the reverse channel transmitted electric power correction control circuit 45.

The reverse channel transmitted electric power correction control circuit 45 receives the present setting values of transmitted electric power and corrects the setting values of transmitted electric power in the reverse channels from the base radio stations 21, 31 using a power reduction step value or a power increase step value. The corrected setting values of transmitted electric power is transmitted through the control channel transmitting/receiving circuit 46 and the switch 42 to the base radio stations 21, 31 in the same manner as with the first reverse channel transmitted electric power correction instruction process.

When the reverse channel transmitted electric power control circuits 25, 35 receive the corrected setting values of transmitted electric power in the reverse channels through the control channel transmitting/receiving circuits 28, 38, the reverse channel transmitted electric power control circuits 25, 35 transmit the corrected setting values of transmitted electric power through the transmitters 26, 36 and the transmitting/receiving antennas 22, 32 to the mobile radio station 11. In response to the transmitted corrected setting values of transmitted electric power received through the transmitting/receiving antenna 14 and the receiver 15, the transmitted electric power control circuit 13 sets the value of transmitted electric power in the reverse channel of the transmitter 12 according to the higher one of the corrected setting values of transmitted electric power.

The third reverse channel transmitted electric power correction instruction process will be described below. For starting a selectively combined connection, the reverse channel transmitted electric power correction control circuit 45 transmits a reverse channel transmitted electric power correction start signal through the control channel transmitting/receiving circuit 46 and the switch 42 to the base radio stations 21, 31.

After the reverse channel transmitted electric power control circuits 25, 35 receive the reverse channel transmitted electric power correction start signal, the reverse channel transmitted electric power control circuits 25, 35 effect the reverse channel transmitted electric power control process on the mobile radio station 11 using a corrective value indicated by the base station control station 41 for the reverse channel transmitted electric power in preference to corrective values individually measured and calculated by the base radio stations 21, 31 for the reverse channel transmitted electric power.

For ending the selectively combined connection, the reverse channel transmitted electric power correction control circuit 45 transmits a reverse channel transmitted electric power correction end signal through the control channel transmitting/receiving circuit 46 and the switch 42 to the base radio stations 21, 31.

After the reverse channel transmitted electric power control circuits 25, 35 receive the reverse channel transmitted electric power correction end signal, the reverse channel transmitted electric power control circuits 25, 35 individually effect the reverse channel transmitted electric power control process based on radio communication qualities measured by the radio communication quality measuring circuits 24, 34 of the base radio stations 21, 31, as with the conventional system.

The fourth reverse channel transmitted electric power correction instruction process will be described below. The error rate measuring circuit 44 measures at set periodic intervals not only the bit or frame error rate of selectively combined signals in the reverse channels of all the communication lines which are being connected, but also signal power to noise power ratios, and transmits the measured results to the reverse channel transmitted electric power correction control circuit 45.

When either one of the transmitted measured results exceeds the upper or lower limit of a permitted range of preset minimum values, the reverse channel transmitted electric power correction control circuit 45 judges whether the value of transmitted electric power in the reverse channels are to be corrected or not, and also calculates a corrective value for the value of transmitted electric power in the reverse channels. If the value of transmitted electric power is to be corrected, the reverse channel transmitted electric power correction control circuit 45 transmits a corrective value for the value of transmitted electric power in the reverse channel of the movable radio station 11 being connected to the base radio stations 21, 31 to which the communication lines are connected, in the same manner as with the first process described above. Generally, as the signal power to noise power ratio becomes worse, the bit or frame error rate also becomes worse. However, since the signal power to noise power ratio may not necessarily be related to the bit or frame error rate depending on the environment of the radio communication lines, a range of permitted values and judging conditions are established depending on the environment for judging whether the value of transmitted electric power is to be corrected.

The fifth reverse channel transmitted electric power correction instruction process will be described below. For the base station control station 41 to start a simultaneous connection of the communication lines of the base radio stations 21, 31 to the same mobile radio station 11, the reverse channel transmitted electric power correction control circuit 45 transmits the measured result of bit or frame error rate or signal power to noise power ratio, which have been transmitted from the error rate measuring circuit 44, to the base radio stations 21, 31 to which the communication lines are connected.

Based on the received measured result of the error rate or the signal power to noise power ratio, the reverse channel transmitted electric power control circuits 25, 35 calculates a corrective value for the value of transmitted electric power in the reverse channel of the mobile radio station 11 being connected, and instructs the mobile radio station 11 to correct the value of transmitted electric power in the same manner as with the first reverse channel transmitted electric power correction instruction process described above.

While a preferred embodiment of the present invention have been described using specific terms, such description is for illustrative purposes only, and it is to be understood that changes and variations may be made without departing from the spirit or scope of the following claims.

What is claimed is:

1. A system for controlling the electric power transmitted in a reverse channel in a mobile communication system controlling to reduce a value of transmitted electric power of a mobile radio station being connected when the communication quality of a signal received from said mobile radio station exceeds a range of permitted values, comprising:

a plurality of base radio stations; and a base station control station having said base radio stations as subordinates, said base station control station comprising:

an error rate measuring circuit for, while said base station control station is simultaneously connecting communication lines of said base radio stations to said mobile radio station, measuring at set periodic intervals error rate of selectively combined signals in reverse channels transmitted from said mobile radio station through all said connected communication lines to said base radio stations;, and transmitting said measured error rate; and a reverse channel transmitted electric power correction control circuit for receiving said measured error rate transmitted from said error rate measuring circuit, and, if said measured error rate exceeds the upper or lower limit of a permitted range of preset minimum values, transmitting a corrective value for the value of transmitted electric power of said mobile radio station being connected to said base radio stations to which said communication lines are connected;

each of said base radio stations comprising:

a reverse channel transmitted electric power control circuit responsive to said transmitted corrective value for the value of transmitted electric power from the reverse channel transmitted electric power correction control circuit, for instructing said mobile radio station to correct the value of reverse channel transmitted electric power from said mobile radio station according to said transmitted corrective value in preference to a corrective value measured and calculated for the value of transmitted electric power by said base radio station.

2. A system for controlling the electric power transmitted in a reverse channel according to claim 1, wherein said reverse channel transmitted electric power control circuit transmits a present setting value of transmitted electric power in the reverse channels at set periodic intervals, or at a level changing occasion, to said reverse channel transmitted electric power correction control circuit, and wherein said reverse channel transmitted electric power correction control circuit receiving said present se:ting value of transmitted electric power in the reverse channels, corrects said present setting value of transmitted electric power in the reverse channels using said transmitted corrective value for the value of transmitted electric power in the reverse channels instructed to said mobile radio station, and transmitting the corrected setting value of transmitted electric power in the reverse channels to each of said base radio stations.

3. A system for controlling the electric power transmitted in a reverse channel according to claim 1, wherein said reverse channel transmitted electric power correction control circuit, when said base station control station starts simultaneously connecting said communication lines of said base radio stations to said mobile radio station, transmits a reverse channel transmitted electric power correction start signal to said base radio station, and, when said base station control station ends, simultaneously connecting said communication lines of said base radio stations to said mobile radio station, transmitting a reverse channel transmitted electric power correction end signal to said base radio station, and wherein said reverse channel transmitted electric power control circuit, after said reverse channel transmitted electric power correction start signal is received and until said reverse channel transmitted electric power correction end signal is received, controls the value of transmitted electric power of said mobile radio station using said corrective value of the value of transmitted electric power in the reverse channels instructed from said base station control station in preference to said corrective value measured and calculated for the value of transmitted electric power in the reverse channels by said base radio station.

4. A system for controlling the electric power transmitted in a reverse channel according to claim 1, wherein said error rate measuring circuit measures at said set periodic intervals said error rate and a signal power to noise power ratio of selectively combined signals in transmitted reverse channels of all connecting said communication lines, and transmits said measured error rate and said measured signal power to noise power ratio to said reverse channel transmitted electric power correction control circuit, and wherein said reverse channel transmitted electric power correction control circuit, if said measured error rate and said measured signal power to noise power ratio exceed the upper or lower limits of said permitted range of preset minimum values, judges whether the value of transmitted electric power is to be corrected or not and calculates said corrective value for the value of transmitted electric power, and, if the value of transmitted electric power is to be corrected, transmits said corrective value for the value of transmitted electric power in the reverse channels of said mobile radio station being connected, to said base radio stations to which said communication lines are connected.

5. A system for controlling the electric power transmitted in a reverse channel according to claim 1, wherein said reverse channel transmitted electric power correction control circuit comprises means for, when said base station control station starts simultaneously connecting communication lines of said base radio stations to said mobile radio station, transmits said measured error rate or a measured signal power to noise power ratio from said error rate measuring circuit to said base radio stations to which said communication lines are connected, and wherein said reverse channel transmitted electric power control circuit calculates said corrective value for the value of transmitted electric power of said mobile radio station being connected, based on said measured error rate or said measured signal power to noise power ratio received, and instructs said mobile radio station to correct the value of transmitted electric power.

* * * * *